F. P. Pfleghar,
Latch.
No. 92,354.  Patented July 6. 1869
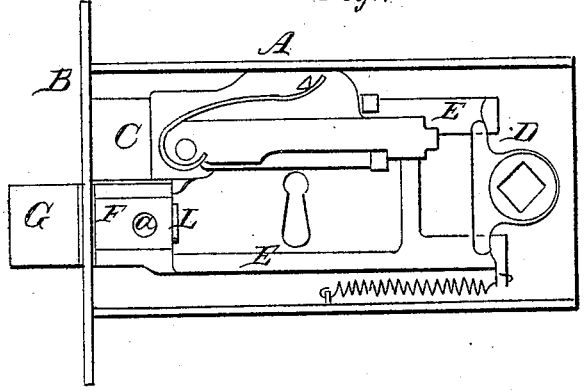
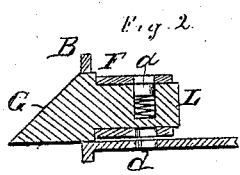
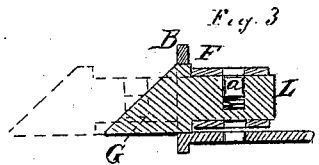
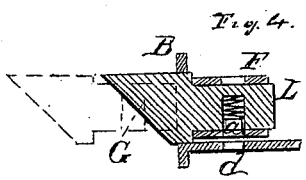
Witnesses
A. J. Tibbits
J. H. Shumway
F. P. Pfleghar
Inventor
By his Attorney
Chas. E. Earl

F. P. PFLEGHAR, OF NEW HAVEN, CONNECTICUT.

Letters Patent No. 92,354, dated July 6, 1869.

---

IMPROVED REVERSIBLE KNOB-LATCH.

---

The Schedule referred to in these Letters Patent and making part of the same.

---

*To all whom it may concern:*

Be it known that I, F. P. PFLEGHAR, of New Haven, in the county of New Haven, and State of Connecticut, have invented a new Improvement in Knob-Latches; and I do hereby declare the following, when taken in connection with the accompanying drawings, and the letters of reference marked thereon, to be a full, clear, and exact description of the same, and which said drawings constitute part of this specification, and represent, in—

Figure 1, a view of the lock, the plate removed to show the interior; and in

Figures 2, 3, and 4, sectional views, to illustrate the operation.

This invention relates to an improvement in knob-latches, the object being to make the bolt reversible for a right or left-hand door; and The invention consists in the arrangement of a bolt in a socket, (the socket being moved by the follower within the case,) so that the bolt may be turned to either direction, the right or left, and secured in the socket in either position by a spring-catch in the tail-piece of the bolt.

In order to the clear understanding of my invention, I will fully describe the same, as illustrated in the accompanying drawings.

A is the case.

B, the face-plate.

C, the lock-bolt.

D, the follower, arranged so as to operate upon the yoke E, to draw the yoke in whichever way the knob is turned.

Upon the end of the yoke, near the face-plate, is formed a socket, F.

G, the latch-bolt, is formed with a round tail-piece, L, which fits into the socket F, and in the said tail-piece is a spring-catch, a, arranged so that when the latch-bolt is set into the socket, the catch a will spring into a recess through the socket, as seen in figs. 1 and 2. The square part of the latch-bolt, resting in the face-plate, guides it into position; and when it is desired to reverse the latch-bolt, as from the position in fig. 2 to that in fig. 4, press the spring-catch in, and withdraw the bolt partially from the socket, as denoted in fig. 3. The withdrawal is for the purpose of clearing the square part of the bolt from the face-plate. In this position the bolt is easily turned to the position in red, fig. 4, then pressed into the socket. The catch flies into a corresponding recess or opening in the socket, as seen in fig. 4.

Through the case, upon both sides, an opening is made, as at d, through which to press upon the spring-catch, when it is desired to reverse the latch.

I do not, broadly, claim the arrangement of the latch-bolt, so as to be reversed in the socket.

Having fully described my invention,

What I claim as new and useful, and desire to secure by Letters Patent, is—

The arrangement of the latch-bolt G, in the socket F, so as to be reversed in the manner described, and held in position by the spring-catch a, in the tail-piece of the bolt, as and for the purpose set forth.

F. P. PFLEGHAR.

Witnesses:
  A. J. TIBBITS,
  J. H. SHUMWAY.